United States Patent Office 3,120,758
Patented Feb. 11, 1964

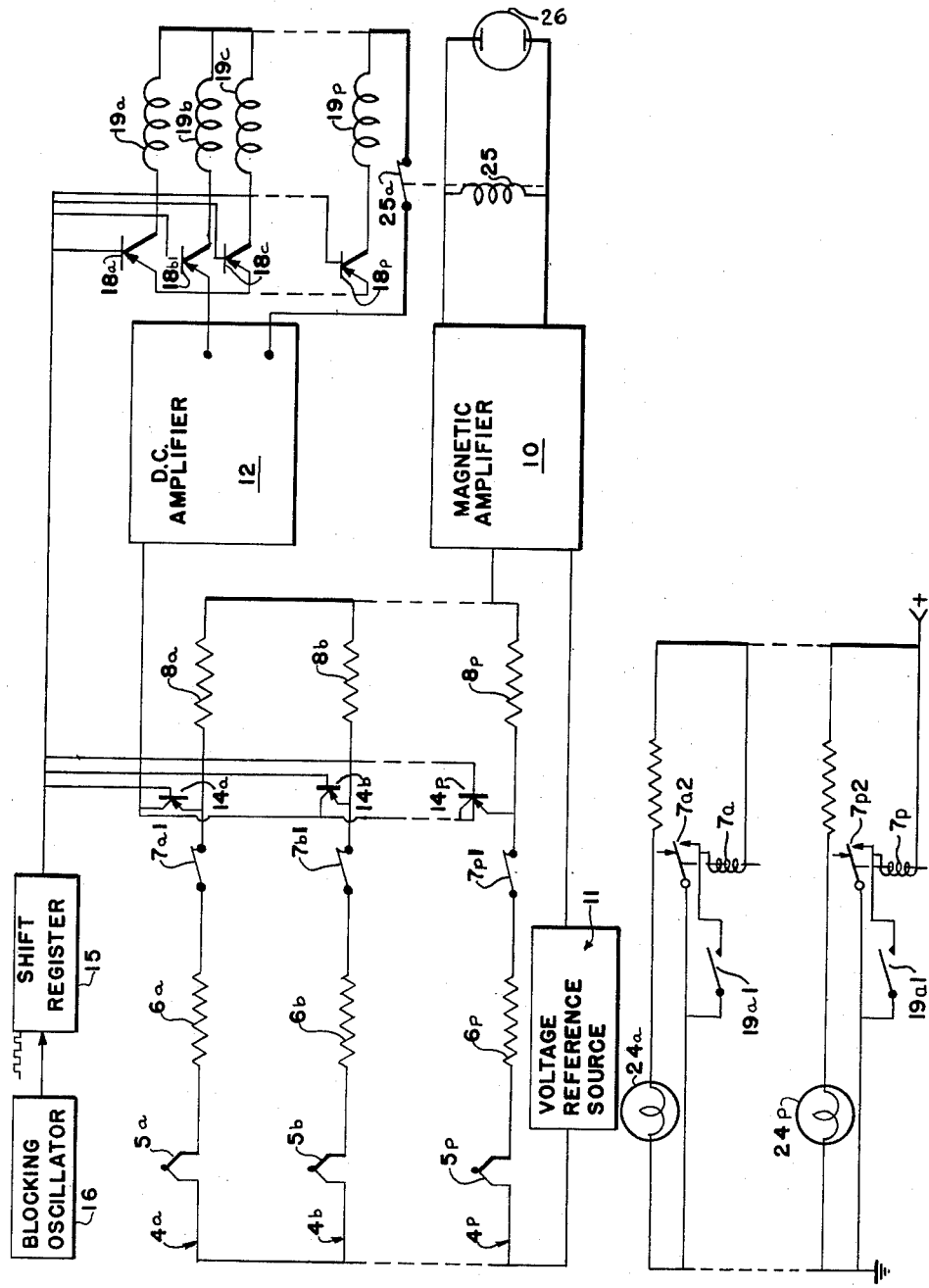

3,120,758
ELECTRICAL TESTING EQUIPMENT
Michael J. Craddock, 11 Clifton Ave., Wembley, England, and David M. Shaw, 24 Webster Gardens, Ealing (W.5.), England
Filed June 1, 1960, Ser. No. 33,245
5 Claims. (Cl. 73—341)

This invention relates to equipment for the continuous study of certain conditions existing at a large number of points. The invention may be used, in particular, for examining the temperatures and the vibration conditions at selected points in a plurality of gas turbines or jet engines for an aircraft; or again, it may be used in the control of atomic reactors. However, no limitation is to be put upon the invention in respect of its field of use, since it can be used to monitor flow-rates of fluids, pressures of fluids, voltages, or any other parameter that can be represented by a voltage.

In an equipment for indicating the temperature conditions at a number of points perhaps forty in all, say ten in each of four aircraft engines, a thermocouple is introduced at each point, and the signals therefrom, after being corrected by comparison with a conventional cold junction compensator, are scanned sequentially and respectively by a switch. After amplification, the signals are applied to the vertical deflection plates of a cathode ray tube.

In an equipment for indicating vibration conditions at a number of points in the engines, a vibration transducer is introduced at each point, and the signals are passed through a band pass filter followed by an amplifier and a rectifier. The resulting signals are scanned sequentially and repetitively by a switch, which may be the same switch as that already mentioned for the temperature display. Alternatively, if more than first-order vibrations are to be studied, a direct picture of waveform may be displayed if the sweep rate of the cathode ray tube be equivalent to engine speed.

The invention may also be used in the control of an atomic energy power station, and for insuring the stability of the reactors. Such a control system may involve the use of a large number of thermocouples, divided into groups of say, sixteen. The output of each group is averaged and used to control part of the reactivity of the reactor. It is therefore necessary to detect the failure of any of the thermocouples, and disconnect a faulty couple from the circuit. Temperature differences of up to 25 degrees centigrade between individual couples in the same group are normal, but a difference of 75–100 degrees C. is to be interpreted as due to a fault.

Thus, an equipment is required which will average and amplify the outputs of sixteen thermocouples, and independently sample each thermocouple in turn, taking the appropriate action if a large error is detected.

The averaging of the thermocouple outputs is accomplished by placing them in parallel across the input of a magnetic amplifier. It is a well known fact that if a number of voltage sources, each having the same series source resistance are placed in parallel, the output of such an arrangement is exactly equivalent to a single voltage, equal to the average of the separate voltages, in series with a source resistance whose value is that of any one of the separate resistances divided by the number of parallel sources.

Still other objects and advantages of the present invention will in part be pointed out with particularity and will in part be obvious as the following description proceeds taken in conjunction with the accompanying drawing which shows, by way of example only, a block schematic diagram for a unit for averaging, scanning, and comparing, the signals derived from a large number of thermocouples. Averaging, scanning, and comparing is a procedure well known in the art. For example, the outputs from several transducers or other voltage or current generating devices can be paralleled electrically and the combined or common output applied to the vertical plates of an oscilloscope. Using the proper horizontal sweep the averaged transducer output would appear as a horizontal line. In scanning, the individual outputs from several transducers can be sequentially applied through electronically or mechanically driven switching devices to the vertical plates of the oscilloscope. Alternate switch positions may make connection to the standard or nominal voltage. In viewing the oscilloscope connected in this manner, short horizontal traces would be observed interlaced with short traces of the standard voltage with which they were being compared. The duration of the traces at the various voltage levels would depend upon the rate at which the switching took place and the sweep speed of the oscilloscope.

In the drawing, the sixteen thermocouples $5a$–$5p$ are each in series with a resistor $6a$–$6p$ whereby the source resistance of each thermocouple is padded out to 250 ohms, normally-closed relay contacts $7a1$–$7p1$, and a resistor $8a$–$8p$ all of equal resistance, used for sampling individual thermocouples. The individual circuits $4a$–$4p$ are connected in parallel so that their combined output is equal to the average of the sixteen thermocouples.

A connection common to outputs from all of the thermocouples is made to the input of the 3-stage magnetic amplifier 10. The output of a constant voltage reference circuit 11 is also applied to the input of magnetic amplifier 10. The amplifier is enabled in this manner to respond to the difference between the thermocouple average output voltage and the standard reference voltage. The response is continuous without dependence upon switching circuitry which may cause transients since the recovery time of magnetic amplifiers is of the order of one cycle. See NAVSHIPS 900,172 publication Magnetic Amplifiers, May 1954, page 45. Moreover, by including the reference voltage at the amplifier input the amplifier current is kept low when thermal equilibrium in the reactor is reached and the current through each thermocouple is considerably reduced.

When the thermocouples are all producing the same voltage the individual currents will be very low, but if one of the thermocouples produces a voltage significantly different from the average, circulating currents will flow in the parallel circuits $4a$–$4p$; in particular, increased current will flow in the branch of the high-output thermocouple, causing an increase in voltage across the applicable resistor $8a$–$8p$. Since there are a plurality of thermocouples, the average voltage output applied to the magnetic amplifier will rise only a very small amount. However, the outputs of the individual thermocouples, as developed at the thermocouple end of the resistors $8a$–$8p$, are monitored sequentially and the faulty component causing the high thermocouple reading may be located with little delay. The voltage developed across resistors $8a$–$8p$ is applied to D.C. amplifier 12 by switching transistors $14a$–$14p$, only one output being connected at a time. Blocking oscillator 16 free runs at a rate manually set at between 1 and 3 cycles per second. The blocking oscillator drives shift register 15 whose action is similar circuitwise to a two-deck multipole rotary switch. A wire lead is connected from one deck of the simulated switch to the base of each switching transistor $14a$–$14p$, the arm of the switch being connected to the input of the D.C. amplifier 12. Similarly, a wire lead is connected from the second deck of the simulated switch to the base of each of the switching transistors $18a$–$18p$, the arm of this deck being connected to the output of D.C. amplifier 12. In the example used in the figure, there are 16 thermocouples 5a–5p. Using the 1- to 3-cycles per second rate of the driving blocking oscillator 16 will assure that each thermocouple circuit will be sampled once each .5 to 15 seconds.

The D.C. amplifier is a conventional push-pull transistor type having a high input resistance. When placed in parallel with resistors 8a–8p, there is no loading effect on the averaging circuit. By using matched transistors, adequate zero stability is obtained and back injection of spurious signals into the thermocouple circuits is avoided.

Concurrent with the switching of the input to D.C. amplifier 12, the output is also switched. For example, the first input to D.C. amplifier 12 may be from thermocouple 4a, connected to the amplifier through switching transistor 14a. Concurrently, the output of the D.C. amplifier is connected through switching transistor 13a to the coil of relay 19a. The action of switching transistors is well known in the art and is similar to gating plate current in an electron tube on and off by changing the bias on the tube's grid from positive to negative. The use of switching transistors is described on page 63ff. in The Transistor Manual (third edition) issued by General Electric Company under copyright 1958. Under normal conditions (temperature rise up to 25° C.) none of the relays is energized. However, if the thermocouple being sampled produces an abnormally high output indicating a fault, such as a temperature rise of 75 to 100° C., for example, the applicable relay 19a–19p will be operated. One set of contacts, 19a1 for example, will close; this energizes relay 7a. Normally closed contacts 7a1 open, disconnecting the high-reading thermocouple from the circuit. Concurrently, contacts 7a2 latch relay 7a in the energized position and simultaneously open the short across lamp 24a which therefore lights.

The relay contacts 7a1–7p1 are of the mercury switch type with two electrodes of identical material in order to avoid introducing unwanted thermal E.M.F.'s into the thermocouple circuit.

A considerable difference may exist during start up between the datum temperature and the average temperature of the thermocouples.

In order to prevent spurious operation of the fault indicating circuits under these conditions, relay 25 is connected across the magnetic amplifier output. This relay will be operated when large outputs occur during start up datum changes, etc. and its contacts 25a1 open the output circuit of the D.C. amplifier.

An oscilloscope 26 may be employed as an indicator means. In place of the oscilloscope recording devices, such as oscillographs, or other forms of voltage magnitude indicating devices may be employed.

Having thus disclosed out invention, what is claimed is:

1. An apparatus for indicating the average value of a plurality of conditions being sensed, and simultaneously indicating the respective individual values of each of said conditions, comprising:
   a plurality of transducers adapted to provide an output voltage indicative of the conditions being sensed by each of said transducers;
   a plurality of branch circuits each including one of said transducers;
   a resistor in series with each of said transducers, the sum of the resistances of said resistor and said transducer being substantially identical in each said branch circuit, each of said branches having said identical series resistance being connected in parallel to a common output point, said output point being thereby adapted to indicate a single voltage equal to the average of the separate voltages in said branch; said output point being connected to a first input of a first amplifier, a constant reference voltage source being connected to a second input of said first amplifier in bucking relation to said first input whereby said first amplifier is adapted to amplify the difference voltage between said constant voltage reference source and said average voltage value output point;
   means for visually displaying the output of said first amplifier, to thereby indicate said average voltage reading;
   means for sequentially sampling each of said transducers in said branch circuits simultaneously with said display of said average voltage reading; and
   means for disconnecting an individual branch circuit from said common output point upon a preselected level of reading of said transducer in said branch, said average reading display for the other branches remaining operative.

2. A device as in claim 1 wherein each of said branch circuits includes a switch in series with each of said transducers, a resistor in series with each of said switches, and means for sequentially sampling the voltage developed across each of said last named resistors;
   a second amplifier to amplify said sampled voltage;
   means connected to said second amplifier and arranged to open said switch in series with said transducer whenever the said sampled voltage produced by said transducer exceeds a predetermined level, to thereby disconnect said branch circuit from said common output point; and
   visual display means to indicate which of said branch circuits is in the disconnected condition.

3. A device as in claim 1 wherein said sequential sampling means comprises:
   a plurality of transistors, one of said transistors being connected to each of said branch circuits;
   a shift register for sequentially placing each of said transistors in conducting relationship to connect said sample amplifier with said branch circuit; and
   a plurality of transistor controlled relay circuits including transistors connected to the output of said sample amplifier, said transistors being sequentially operated by means of said shift register to energize a relay in series with each of said relay circuit transistors, said relay being arranged to open said corresponding switch in each of said branch circuits whenever the output of said sample amplifier is in excess of a predetermined value.

4. A device as in claim 1 wherein said means for disconnecting an individual branch is disabled whenever the output voltage of said first amplifier exceeds a predetermined value.

5. A device as in claim 1 wherein each of said branch circuits is provided with a thermocouple adapted to provide an output voltage indicative of the condition being sensed by each of said thermocouples.

References Cited in the file of this patent
UNITED STATES PATENTS

| | | |
|---|---|---|
| 2,485,343 | Zuschlag | Oct. 18, 1949 |
| 2,593,224 | Utterback | Apr. 15, 1952 |